United States Patent
Babanezhad

(10) Patent No.: US 6,169,764 B1
(45) Date of Patent: Jan. 2, 2001

(54) ANALOG ADAPTIVE LINE EQUALIZER

(75) Inventor: Joseph N. Babanezhad, Cupertino, CA (US)

(73) Assignee: Plato Labs, Inc., San Jose, CA (US)

( * ) Notice: Under 35 U.S.C. 154(b), the term of this patent shall be extended for 0 days.

(21) Appl. No.: 09/044,710

(22) Filed: Mar. 19, 1998

(51) Int. Cl.[7] .................................................... H03H 7/30
(52) U.S. Cl. ............................ 375/233; 333/18; 333/28 R
(58) Field of Search ..................................... 375/229, 232, 375/233; 333/18, 28 R, 69

(56) References Cited

U.S. PATENT DOCUMENTS

| | | | |
|---|---|---|---|
| 4,607,231 | * | 8/1986 | Nakayama ........................ 333/28 R |
| 5,481,564 | * | 1/1996 | Kakuishi et al. ..................... 375/232 |
| 5,708,703 | * | 1/1998 | Nagaraj .................................. 333/18 |
| 5,764,695 | * | 6/1998 | Nagaraj et al. ....................... 375/232 |
| 5,978,417 | * | 11/1999 | Baker et al. .......................... 375/232 |

* cited by examiner

Primary Examiner—Tesfaldet Bocure
(74) Attorney, Agent, or Firm—Townsend and Townsend and Crew LLP

(57) ABSTRACT

A low cost and low power adaptive cable equalizer that is particularly suitable for fast Ethernet data communication is disclosed. According to various embodiments of the present invention, first and second order adaptive equalizers are implemented using CMOS continuous-time analog signal processing, with variable resistors, linear capacitors and high-speed operational amplifiers.

13 Claims, 5 Drawing Sheets

ANALOG ADAPTIVE LINE EQUALIZER

BACKGROUND OF THE INVENTION

The present invention relates in general to data communication circuitry, and in particular to an adaptive line equalizer circuit that is particularly suited for high speed, low power data communication.

In high-speed data communication, such as Fast Ethernet (e.g. 100BASE-T), the mere filtering of the receive signal (to remove unwanted noise and other corruptive signals) is not sufficient for recovering the data with small bit error rate (BER). In the case of 100BASE-T communication, for example, dispersion-loss of the cable is linearly proportional to the cable's length and square-root of the data rate. A cable equalizer circuit is therefore necessary in order to compensate for the cable's losses and to improve the inter-symbol interference (ISI) of the received data. The function of the equalizer is to synthesize a frequency response that is inversely proportional to that of the cable's. When using an adaptive equalizer there is an added advantage in that it enables the receiver to handle variable cable lengths without significantly altering the ISI of the recovered data. Depending on the required degree of cable loss, compensation over different cable lengths and frequency bandwidths, first or second order high-pass filtering is required.

Conventional prior art adaptive equalizers have typically used peak detection circuitry to detect the level (or strength) of the received signal at the input of the slicing comparator. The peak detection approach, however, is highly susceptible to jitter, which results in increased bit error rate (BER) for the adaptive equalizer at higher data transmission rates. An improved adaptive equalizer architecture based on a high speed bipolar implementation was proposed by Alan J. Baker in "An Adaptive Cable Equalizer for Serial Digital Video Rates to 400 Mb/s," 1996, IEEE Int'l Solid-State Circuits Conf., p. 174. Baker's adaptive equalizer applies the signal to a slicing comparator after some initial high-pass filtering. The slope of the comparator input signal is adjusted against that of the comparator output signal by means of a servo loop involving the input high-pass filter. By incorporating a two-stage quantized feedback comparator this circuit can handle base-line wander problem that is common to those data communication standards that allow long consecutive identical digits.

While Baker's approach improves the performance of the adaptive equalizer, it's implementation requires a fast bipolar/CMOS (BiCMOS) process running with a 5 volt power supply. Baker's equalizer is therefore more costly to fabricate and consumes more power.

There is a need for an improved adaptive equalizer that can be implemented in a cost-efficient manner and with reduced power consumption.

SUMMARY OF THE INVENTION

The present invention provides a low cost and low power adaptive cable equalizer that is particularly suitable for fast Ethernet data communication. In a specific embodiment, the present invention implements an adaptive equalizer using CMOS continuous-time analog signal processing, with variable resistors, linear capacitors and high-speed operational amplifiers. First, second and higher order adaptive equalizers can be implemented using the teachings of the present invention.

Accordingly, in one embodiment, the present invention provides an adaptive line equalizer including a high-pass filter having an input terminal coupled to receive an input signal, a slicing comparator having an input terminal coupled to the output terminal of the high-pass filter, and a servo control block having a first input coupled to the input of the comparator and a second input coupled to the output of the comparator, and an output coupled to a control input of the high-pass filter, wherein, the servo control block further comprises a squaring circuit. IN a preferred embodiment, the various elements of the adaptive equalizer are implemented with fully differential architecture.

A better understanding of the nature and advantages of adaptive cable equalizer of the present invention may be had with reference to the detailed description and drawings below.

DESCRIPTION OF THE PREFERRED EMBODIMENT

Figure 1:
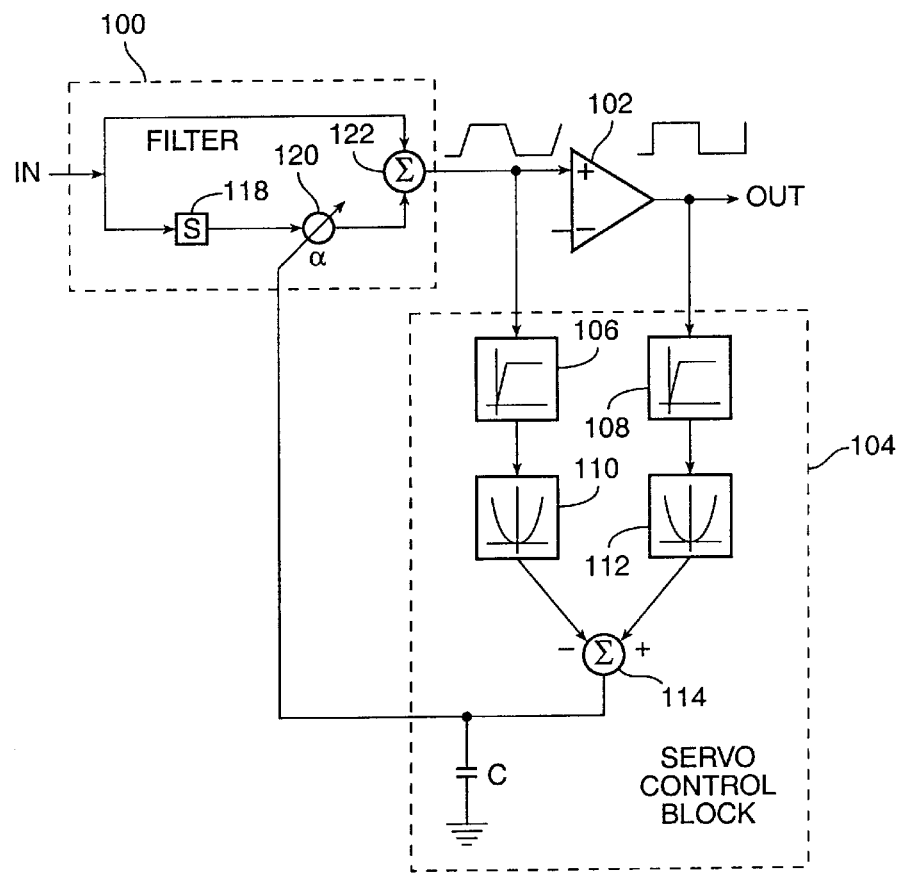
FIG. 1 depicts the architecture of the adaptive equalizer according to one embodiment of the present invention.

Referring to FIG. 1, there is shown an exemplary architecture for implementing the adaptive equalizer according to the present invention. The adaptive equalizer includes a first order high-pass filter 100 that receives the input signal, and a comparator 102 that connects to the output of filter 100. The primary finction of high-pass filter 100 is to boost the high frequency contents of the received signal which has been attenuated by cable's low-pass response. Comparator 102 performs the slicing function. To accurately control the placement of the high-pass filter's zero, a servo loop 104 compares the edges of the signals at the input and output of comparator 102, and generates a control signal for adjusting the location of the high-pass filter's zero. Servo loop 104 includes two high-pass filters 106 and 108 that respectively receive and measure and slope of the input signal and output signal of comparator 102. The outputs of high-pass filters 106 and 108 are fed into respective squaring blocks 110 and 112 that convert the bi-polar signal at the output of each high-pass filter 106 and 108 into a uni-polar signal. By performing this conversion with squaring circuitry as opposed to, for example, conventional rectifiers, the present invention eliminates the requirement for PN junctions and therefore bipolar technology. Squaring blocks 110 and 112 are preferably implemented using CMOS technology, an exemplary embodiment of which will be described hereinafter in connection with FIG. 6. The output signals of squaring blocks 110 and 112 are subtracted from each other by a summing circuit 114. The output of summing circuit 114 is then integrated by capacitor 116 and fed back to high-pass filter 100 as the control signal.

Figure 2:
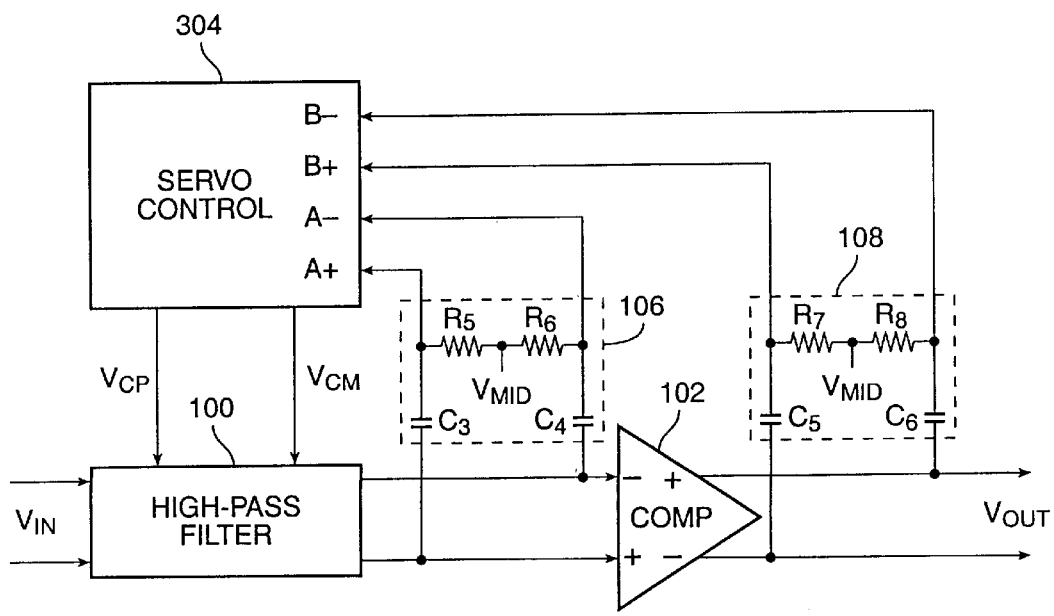
FIG. 2 is a top-level circuit schematic for implementing the adaptive equalizer architecture according to the present invention.

Referring to FIG. 2, there is shown a top-level circuit schematic for implementing the adaptive equalizer architecture according to a preferred embodiment of the present invention. The same reference numerals are used herein to refer to the same elements throughout the various Figures. A differential high-pass filter 100 receives a differential input Via and provides the high-frequency gain boosting by means of the variable left-half plane zero in its transfer function. The differential output of filter 100 is applied to a differential slicing comparator 102 where, by means of quantized feedback approach, the circuit can be modified to handle the base-line wander problem. Comparator 102 is preferably a continuous-time circuit employing regenerative positive feedback. An exemplary embodiment for such comparator (with strobe input removed) is given in "A CMOS 8-bit high-speed A/D converter IC," by A. Yukawa, IEEE JSSC vol. SC-20, No. 3, June 1985, which is hereby incorporated by reference in its entirety for all purposes. The slope of signals at the inputs and outputs of comparator 102 are measured by high-pass RC circuits 106 and 108, respectively. The results are applied to a servo control block 304. Servo control block 304 implements squaring blocks (110 and 112 shown in FIG. 1), and generates the differential control voltage VCP and VCM to control the location of the zero of high-pass filter 100.

In this configuration, servo loop 104 operates to move the zero of high-pass filter 100 in order to maximize the slope of the input signal to comparator 102 to match that of the sharper output signal of the comparator. To accomplish this, high-pass filter 100 is not only required to be very wideband, but also to provide enough gain in order to compensate for cable loss at high frequencies.

To implement high-pass filter 100 as a continuous-time filter, various techniques are available. One widely used approach employs well-known transconductance-capacitor (or gm-C) techniques. The gm-C approach is amenable to high-frequency applications mainly because the transconductance elements are used in open-loop configuration. However, because transconductance elements are used open-loop their harmonic distortion tends to be higher. Furthermore, since a large input voltage is applied to the inputs of these transconductance elements their implementation for low voltage (e.g., 3 volt) applications becomes more complicated.

Figure 3:
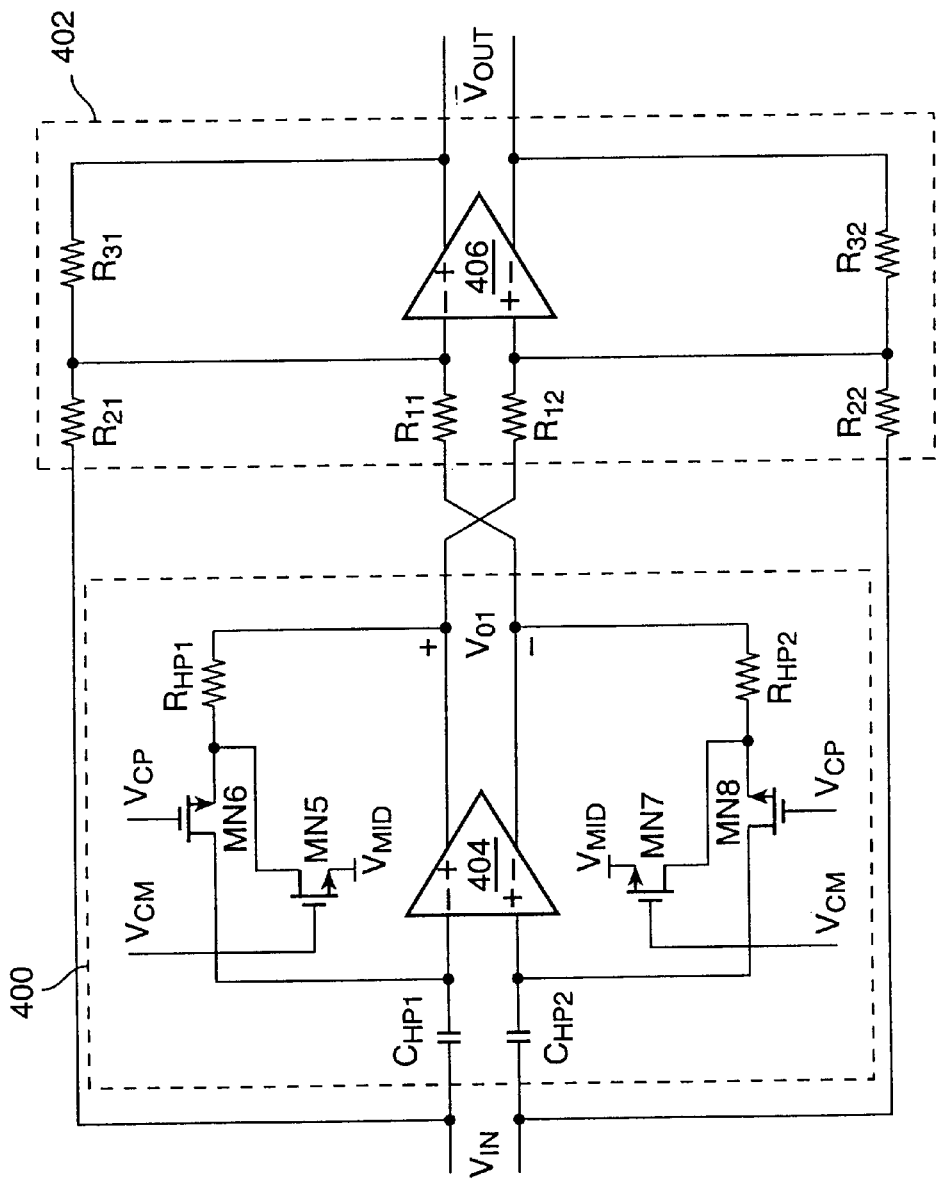
FIG. 3 shows an exemplary implementation for a first-order high-pass filter for use in the adaptive equalizer according to the present invention.

According to a preferred embodiment of the present invention, a high-pass continuous-time (RMC) filter is implemented by using differentiators that are made up of a variable resistor (R) along with an operational amplifier (opamp) and its differentiating capacitor (C). Referring to FIG. 3, there is shown an exemplary embodiment for the high-pass continuous-time RMC filter. The variable zero is synthesized by means of an RMC differentiator 400 whose differential outputs are cross-connected to differential inputs of a summing stage 402. The RMC implementation for differentiator 400 lowers distortion that can otherwise degrade the ISI of the recovered data pattern. Differentiator 400 is made up of a differential opamp 404 connected to an RMC network including capacitors CHP1 and CHP2, current-steering MOS transistors MN5, MN6, MN7 and MN8, and resistors RHP1 and RHP2. The transfer function for differentiator 400 is given by:

$$Vol/Vin = -R_{eq} \times CHP \times s,$$

where, $R_{eq} = 2 \times RHP \times [1 - \alpha(VCP-VCM)]$, with $\alpha$ determined by current-steering transistor parameters.

The differential output Vol of differentiator 400 is cross-coupled to the first differential input at resistors R11 and R12 of summing stage 402. Summing stage 402 also receives Via at a second differential input at resistors R21 and R22. Summing stage 402 further includes a differential opamp 406 that connects to resistors R21, R11, R12, and R22, and feedback resistors R31 and R32. The output of the filer Vout if given by:

$$Vout = -(R31/R11) \times (-Vol) - (R31/R21) \times Vin$$

or:

$$Vout = -[(R31/R11) \times R_{eq} \times CHP \times s + (R31/R21)] \times Vin,$$

Thus, given (VCP−VCM)=0, time constant of differentiator 400 can be adjusted by selecting the appropriate values for the resistors and capacitors CHP and RHP. Given a worst case cable loss that can be modeled by a first-order low-pass stage that provides a similar loss at 62.5 MHz (equivalent to 125 Mb/s) as that of an exemplary 100 meter CAT5 cable, the time constant for differentiator 400 can be adjusted such that its zero cancels the pole of the first-order low-pass stage. The differential control voltage (VCP−VCM) is then used to fine-tune the location of the zero by means of the servo loop.

Figure 4:
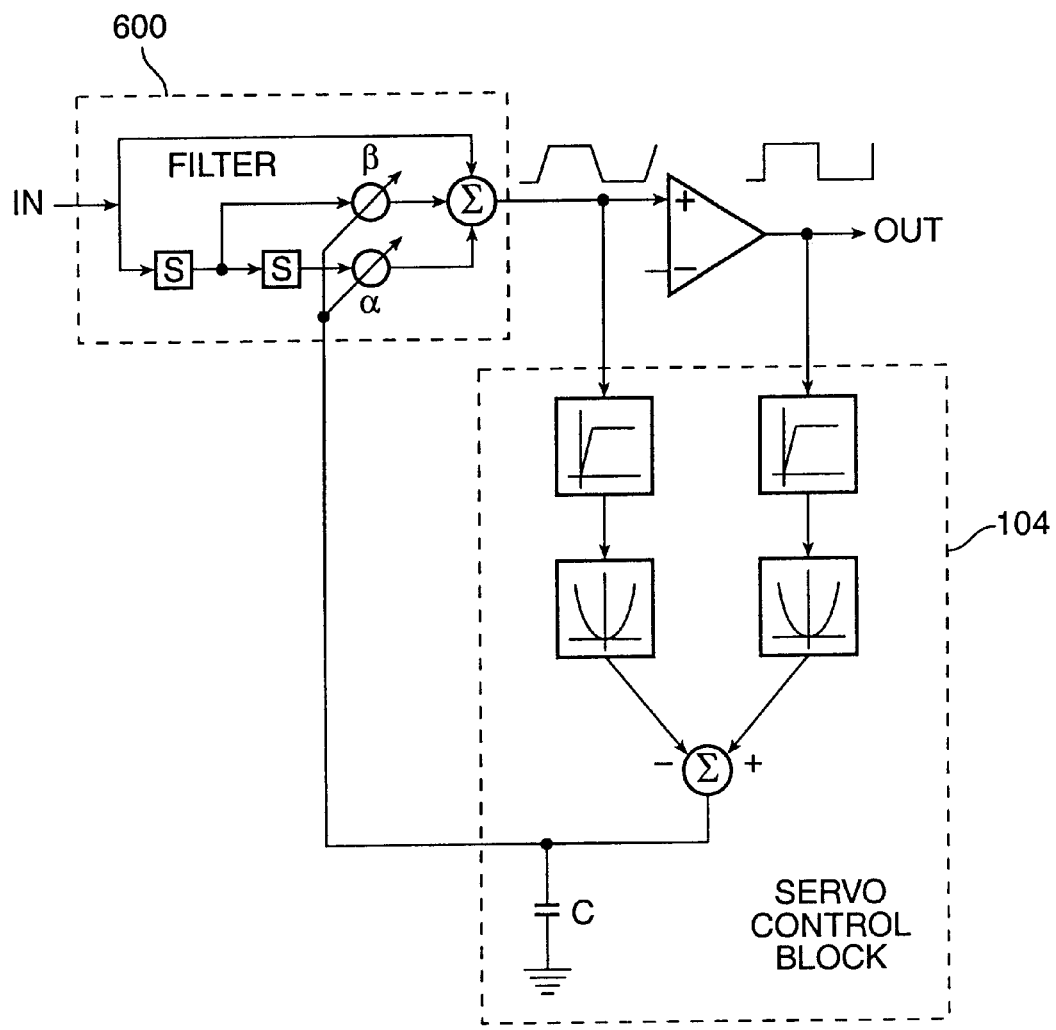
FIG. 4 is a block diagram of an adaptive equalizer using a second-order filter according to another embodiment of the present invention.
Figure 5:
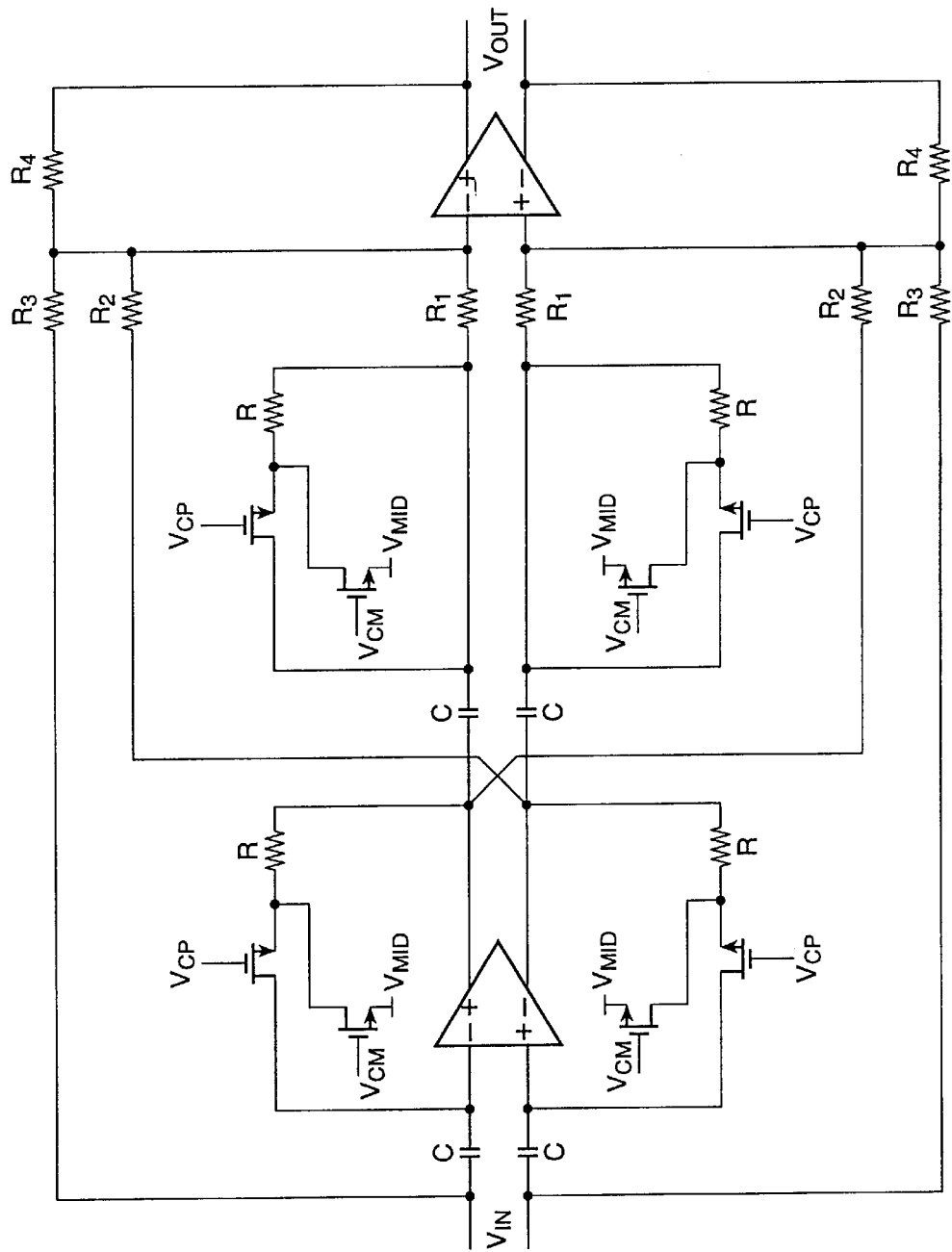
FIG. 5 is an exemplary circuit implementation of a second-order high-pass filter for use in the adaptive equalizer of FIG. 4.

The embodiment of the adaptive equalizer described thus far is based on using a first-order high-pass filter. If the line attenuation is very high (e.g., very long cable) and the frequency response of the cable is very much degraded, the worst case cable loss is better modeled by a second-order filter. Under these conditions a preferred embodiment may include higher order high-pass filter in the adaptive equalizer. The architecture of the present invention accommodates the use of higher order high-pass filters. In an alternate embodiment, the present invention employs a second-order high-pass filter. A block diagram of an adaptive equalizer using a second-order high-pass filter is shown in FIG. 4. This embodiment is identical to that shown in FIG. 1 except for high-pass filter 600 which is shown as a second-order filter. Servo loop 104 supplies two control signals $\alpha$ and $\beta$ each controlling the location of their respective zeros. FIG. 5 provides an exemplary circuit schematic for an RMC implementation of the second-order high-pass filter 600. The principles of operation of the circuit is very similar to the circuit of FIG. 3 except for the inclusion of a second RMC differentiator.

One of the advantages of the RMC architecture is that due to the series connection between a linear resistor and non-linear MOS transistors (that operate in their non-saturation region), only a fraction of input voltage falls across the transistors. This reduces the non-linearity of the differentiator. In order to extend the RMC approach to high frequencies, the high-pass stage needs to have wider bandwidth. One technique that helps increase the bandwidth is to accurately compensate for the distributed parasitic capacitance of the polysilicon resistors. In a preferred embodiment, the distributed parasitics of each resistor R is compensated for by placing a shorted dummy resistor, with a value ⅙ of the main resistor (inside a dedicated p-well), in parallel with each main resistor R This technique is described in greater detail in the above-referenced patent application.

A further feature that helps increase the bandwidth of the high-pass filter according to the present invention, is the use of wide-band current-feedback opamp in the high-pass stage. A preferred example of one such opamp is described in greater detail in commonly-assigned, co-pending patent application number 09/004,628, now issued as U.S. Pat. No. 6,028,479 on Feb. 22, 2000, entitled "Low Voltage High Speed Line Driver Circuit," by J. N. Babanezhad, which is hereby incorporated by reference in its entirety for all purposes. The novel current-feedback opamp exhibits unity-gain bandwidth values in excess of, for example, 350 MHz. The value of resistors R11 and R21 are preferably almost an order of magnitude smaller than that of RHP1. This helps keep the impedance seen at the input of summing stage 402 low and therefore achieves a wider bandwidth.

Figure 6:
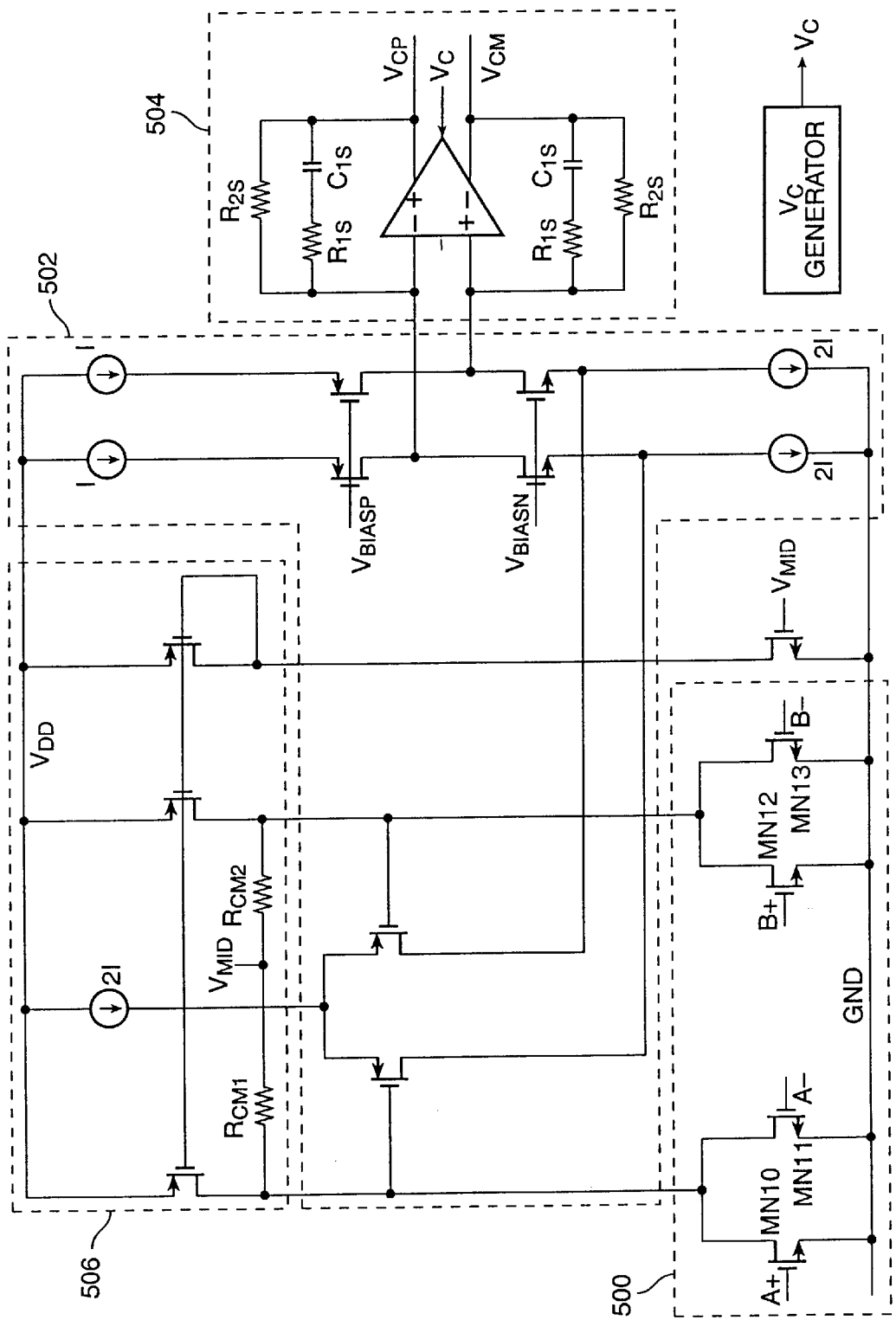
FIG. 6 shows a preferred embodiment for servo control block used in the adaptive equalizer of the present invention.

Referring to FIG. 6, there is shown a preferred embodiment for servo control block 304. Servo control block 304 includes a squaring circuit 500 whose outputs connect to a differential voltage-controlled current source 502. According to this embodiment, the squaring function is realized by two pairs of common-source n-channel MOS transistors MN10/MN11 and MN12/MN13. The drain terminals of each pair tie to each other and their gate terminals connect to nodes A+ and A−, and B+ and B−, respectively (see FIG. 2). The common-mode component of squaring circuit 500 is cancelled by applying the outputs of these two squaring circuits to differential voltage-controlled current source 502. The outputs of voltage-controlled current source 502 drive a differential trans-impedance amplifier 504 that provides for current-to-voltage conversion. The outputs of amplifier 504 thus provide the control voltages VCP and VCM for high-pass filter 100. A bias network 506 receives VMID and biases squaring circuit 500 and differential voltage-controlled current source 502. The common mode of amplifier 504 is set by a VC generating block 508. The capacitance C of FIG. 1 has been implemented by two capacitors ClS shown in FIG. 4, that provide for loop stability.

In conclusion, the present invention provides a low cost and low power adaptive line equalizer that is particularly suitable for fast Ethernet data communication. According to various embodiments of the present invention, first and second order adaptive equalizers are implemented using CMOS continuous-time analog signal processing, with variable resistors, linear capacitors and high-speed operational amplifiers. While the above provides a complete description of several specific embodiments of the present invention, it is possible to use various alternatives, modifications and equivalents. For example, while the use of squaring blocks enables the advantageous use of CMOS process to implement the servo loop, bipolar transistors connected in a similar architecture as shown in FIG. 3, can be used to implement the current-feedback opamp of the present invention. A combined BiCMOS process can thus be used to implement the various embodiments of the present invention. Therefore, the scope of the present invention should be determined not with reference to the above description but should, instead, be determined with reference to the appended claims, along with their full scope of equivalents.

What is claimed is:

1. An adaptive line equalizer comprising:
   a high-pass filter having an input terminal coupled to receive an input signal, and an output terminal;
   a slicing comparator having an input terminal coupled to the output terminal of the high-pass filter, and an output terminal; and
   a servo control block having a first input coupled to the input of the comparator and a second input coupled to the output of the comparator, and an output coupled to a control input of the high-pass filter, wherein, the servo control block further comprises a squaring circuit that converts its input signal from a bi-polar signal to a uni-polar signal.

2. The adaptive line equalizer of claim 1 wherein the high-pass filter is fully differential receiving a differential input signal at first and second input terminals, and generating a differential output signal at first and second output terminals, wherein, the slicing comparator is fully differential having first and second input terminals coupled to the first and second output terminals of the filter, and first and second output terminals, and wherein, the servo control block is fully differential having a first differential pair of input terminals coupled to the first and second input terminals of the slicing comparator, a second differential pair of input terminals coupled to the first and second output terminals of the slicing comparator, and a differential pair of output terminals.

3. The adaptive line equalizer of claim 2 further comprising:
   a first servo loop differential filter coupled between the input terminals of the slicing comparator and the first differential pair of input terminals of the servo control block; and
   a second servo loop differential filter coupled between the output terminals of the slicing comparator and the second differential pair of input terminals of the servo control block.

4. The adaptive line equalizer of claim 3 wherein the squaring circuit is fully differential comprising:
   a first pair of common-source MOS transistors having their gate terminals respectively coupled to the first differential pair of input terminals of the servo control block; and
   a second pair of common-source MOS transistors having their gate terminals respectively coupled to the second differential pair of input terminals of the servo control block.

5. The adaptive line equalizer of claim 4 wherein the squaring circuit further comprises:
   a differential voltage-controller current source coupled to outputs of the squaring circuit; and
   a current-to-voltage amplifier coupled to the differential voltage-controlled current source.

6. The adaptive line equalizer of claim 2 wherein the high-pass filter is a first-order high-pass filter.

7. The adaptive line equalizer of claim 2 wherein the high-pass, filter is a second-order high-pass filter.

8. The adaptive line equalizer of claim 6 wherein the first-order high-pass filter comprises:
   a differential differentiator having a differential pair of input terminals coupled to receive the differential input signal, a control input terminal, and a differential pair of output terminals; and
   a summing circuit having a first differential pair of input terminals cross-coupled to the differential pair of output terminals of the differentiator, and a second differential pair of input terminals coupled to the differential pair of input terminals of the differential differentiator.

9. The adaptive line equalizer of claim 8 wherein the differential differentiator is a continuous-time RMC type circuit.

10. The adaptive line equalizer of claim 9 wherein the differential differentiator comprises:
    a differential operational amplifier having first and second input terminals respectively coupled to the differential pair of input terminals via first and second capacitors, respectively;
    a first feedback path including a first resistor coupled to first and second current-steering MOS transistors, the first feedback path coupling a first output terminal of the operational amplifier to the first input terminal of the operational amplifier; and a second feedback path including a second resistor coupled to first and second current-steering MOS transistors, the second feedback path coupling a second output terminal of the operational amplifier to the second input terminal of the operational amplifier.

11. The adaptive line equalizer of claim 10 wherein the first current-steering MOS transistor in said first feedback path and the first current-steering MOS transistor in said second feedback path receive the differential pair of output terminals of the servo control block at their gate terminals, respectively.

12. The adaptive line equalizer of claim 7 wherein the second-order high-pass filter comprises:

a first differential differentiator having a differential pair of input terminals coupled to receive the differential input signal, a control input terminal, and a differential pair of output terminals;

a second differential differentiator having a differential pair of input terminals coupled to the differential pair of output terminals of the first differential differentiator, a control input terminal, and a differential pair of output terminals; and a summing circuit having a first differential pair of input terminals coupled to the differential pair of output terminals of the second differentiator, a second differential pair of input terminals cross-coupled to the differential pair of output terminals of the first differential differentiator, and a third pair of differential input terminals coupled to the differential pair of input terminals of the first differential differentiator.

13. A differential adaptive line equalizer comprising:

a differential high-pass filter having a pair of input terminals coupled to receive a differential input signal, a pair of output terminals, and a pair of control inputs terminals;

a differential comparator having a pair of input terminals coupled to the pair of output terminals of the differential high-pass filter, and a pair of output terminals;

a first differential servo loop high-pass filter having a pair of input terminals coupled to the pair of input terminals of the comparator;

a second differential servo loop high-pass filter having a pair of input terminals coupled to the pair of output terminals of the comparator;

a first differential squaring circuit having a pair of input terminals coupled to a pair of output terminals of the first differential servo loop high-pass filter;

a second differential squaring circuit having a pair of input terminals coupled to a pair of output terminals of the second differential servo loop high-pass filter, and a differential control voltage generator coupled to the first and second differential squaring circuits, the differential control voltage generator configured to couple a differential control signal to the pair of control input terminals of the differential high-pass filter.

* * * * *